United States Patent [19]

Perez et al.

[11] Patent Number: 5,714,539
[45] Date of Patent: Feb. 3, 1998

[54] POLYMERIC SURFACTANT AND LATEX MADE THEREFROM

[75] Inventors: Leon Perez, Ross Township; Shanti Swarup, Gibsonia; Edward E. McEntire; Lisa E. Jakiela, both of Allison Park, all of Pa.

[73] Assignee: PPG Industries, Inc., Pittsburgh, Pa.

[21] Appl. No.: 130,809

[22] Filed: Oct. 4, 1993

[51] Int. Cl.$^6$ .................................................. C08L 31/00
[52] U.S. Cl. .......................... 524/556; 524/559; 524/560; 524/458; 524/460; 523/200; 523/201; 525/303; 525/309; 525/902
[58] Field of Search ........................ 524/556, 559, 524/560, 458, 460; 523/200, 201, 2; 525/902, 303, 309

[56] References Cited

U.S. PATENT DOCUMENTS

| | | | |
|---|---|---|---|
| 3,812,205 | 5/1974 | Dunkelberger | 525/261 |
| 3,873,488 | 3/1975 | Gibbs et al. | 524/817 |
| 4,151,227 | 4/1979 | Simms | 525/126 |
| 4,499,212 | 2/1985 | Martino | 523/201 |
| 4,647,612 | 3/1987 | Ranka et al. | 524/458 |
| 4,839,417 | 6/1989 | Suetterlin et al. | 524/833 |
| 4,876,313 | 10/1989 | Lorah | 525/281 |
| 4,954,558 | 9/1990 | Tsaur | 525/460 |
| 4,997,877 | 3/1991 | Craig | 524/811 |
| 5,010,140 | 4/1991 | Antonelli et al. | 525/269 |
| 5,035,944 | 7/1991 | Frazza et al. | 428/312.4 |
| 5,081,166 | 1/1992 | Kielbauch et al. | 523/201 |
| 5,139,834 | 8/1992 | Cole | 428/35.8 |
| 5,149,729 | 9/1992 | Englund | 524/366 |
| 5,196,481 | 3/1993 | Owens et al. | 525/108 |
| 5,212,251 | 5/1993 | Lorah et al. | 525/279 |
| 5,244,960 | 9/1993 | Swarup et al. | 524/512 |
| 5,403,894 | 4/1995 | Tsai et al. | 525/285 |

FOREIGN PATENT DOCUMENTS

| | | |
|---|---|---|
| 0429207A1 | 5/1991 | European Pat. Off. . |
| WO94/04581 | 3/1994 | WIPO . |

*Primary Examiner*—Vasu Jagannathan
*Assistant Examiner*—John J. Guarriello
*Attorney, Agent, or Firm*—Dennis G. Millman; Paul S. Chirgott

[57] ABSTRACT

A polymeric surfactant comprises the reaction product of ethylentcally unsaturated monomers at least 40 percent by weight of which are acid group containing monomers, including a combination of both acrylic acid and methacrylic acid, at least a portion of the acid groups being neutralized by a base. Also disclosed is an aqueous acrylic latex made by polymerizing a second polymer from ethylenically unsaturated monomers in the presence of said polymeric surfactant, whereby the latex comprises polymeric particles containing two polymers. The latex may be used to advantage in very low V.O.C. coatings that may be spray applied.

38 Claims, No Drawings

POLYMERIC SURFACTANT AND LATEX MADE THEREFROM

This invention relates to emulsion polymerization wherein ethylenically unsaturated monomers are polymerized while dispersed in an aqueous medium in the presence of a surfactant. The resulting latex polymers can have high molecular weight and are useful in many applications including coatings. However, the inclusion of conventional surfactants can be detrimental to the water sensitivity and adhesion of coatings prepared from such a latex because the surfactants have highly polar groups and are relatively low in molecular weight. To overcome these problems, it has been known to replace some or all of the low molecular weight surfactants with surfactants that are themselves polymeric. In that case, polymerization takes place in two stages, with the polymerization of the surfactant forming a "shell" or outer layer, and the polymerization of the main monomer mixture forming a "core" or interior portion of each latex particle.

Coatings containing waterborne latex polymers generally present difficulties when applied by spraying because the shear forces associated with spraying lead to viscosity instability. Adjusting the composition to stabilize viscosity can be detrimental to the ability of the particles to coalesce into a uniform coating. Coalescence can be aided by adding organic solvents to the coating formulation, but doing so increases the volatile organic content (V.O.C.) of the composition, which is environmentally undesirable.

Thus, there is a need for a latex that can be used in low V.O.C. coating compositions that are sprayable and produce coatings with good adhesion and resistance to water.

U.S. Pat. No. 4,647,612 (Ranka et al.) discloses core-shell latices in which the shell may be an acrylic polymer made by organic solution polymerization of a monomer mixture that includes an unsaturated acid group containing monomer selected from acrylic acid, methacrylic acid, crotonic acid, itaconic acid and $C_1$ to $C_8$ alkyl half-esters of maleic acid or fumaric acid. The patent mentions the possibility that a mixture of acid containing monomers could be used, but no specific mixture is disclosed, nor is any advantage for using a mixture suggested. The acid value of the shell is disclosed to be 50 to 250.

U.S. Pat. No. 4,499,212 (Martino) discloses core-shell latices that are asserted to be stabilized for spraying. The acid level of the shell is not specified, but is said to contain at least one carboxylic acid. The use of organic solvents as coalescing aids is disclosed, indicating that the V.O.C. of compositions utilizing these latices are not as low as would be desired.

U.S. Pat. No. 4,876,313 (Lorah) includes a broad speculative range for acid content of core-shell polymers, but the specific disclosure is limited to relatively low acid levels. Combinations of acids are not suggested.

SUMMARY OF THE INVENTION

It has now been found that by use of a polymeric surfactant formed from polymerizing a monomer mixture that includes a high proportion of unsaturated acid group containing monomers, including at least two different unsaturated acid group containing monomers, a core-shell latex can be produced that exhibits stability during spraying and is capable of coalescing at room temperature without the use of organic coalescing aids. As a result, a coating composition using such a core-shell latex has very low V.O.C. (e.g., less than 1.5, preferably less than 1.0).

The the latex polymers of the present invention have relatively high glass transition temperatures ($T_g$), which is advantageous for enabling coating compositions incorporating the latex to have good stability upon spraying and for the resulting cured film to have good resistance to water. Remarkably, in view of their relatively high glass transition temperatures, the latices of the present invention possess very good low temperature coalescence properties. Conventionally, a glass transition temperature lower than room temperature is considered desirable in order to achieve good coalescence of the latex particles upon curing the coating. But the glass transition temperatures of the latex polymers of the present invention are substantially above room temperature (25° C.), typically above 40° C., and above 60° C. in preferred embodiments. The combination of high $T_g$ and good coalescence is highly desirable and surprising.

The polymeric surfactant of the present invention is polymerized in water from a monomer mixture including at least 40 percent by weight of unsaturated acid group containing monomers, preferably at least 50 percent by weight of unsaturated acid group containing monomers, and most preferably greater than 60 percent of unsaturated acid group containing monomers. The amount of acid in the shell is substantially greater than the amount conventionally considered necessary to provide latex particle stability in an aqueous medium upon neutralization. At these high acid levels, it was found to be highly desirable for the monomer mixture from which the surfactant is polymerized to include more than one type of acid group containing monomer in order to attain a combination of blister resistance and acceptable application theology. A preferred combination of unsaturated acid group containing monomers includes acrylic acid and methacrylic acid, with significant inclusions of both. For example, the relative weight proportions of acrylic acid to methacrylic acid should be at least 1:10 up to 10:1, preferably in the range 1:3 to 3:1, most preferably in the range 2:3 to 3:2.

As is conventional with water dispersible polymers, the acid groups of the polymeric surfactant are neutralized with a base in order to form a salt of the polymer which is stable in water. It is a feature of preferred embodiments of the present invention that no more than 80 percent of the acid groups are neutralized, whereby good blister resistance is achieved when coatings incorporating the latex are applied onto complex surfaces. Preferred embodiments are not only dispersible, but soluble in water. Although a small amount of non-polymeric surfactant may be present to assist in the polymerization, the dispersibility or solubility of the polymers of the present invention is primarily attributable to the high acid group content of the polymer. The acid group containing monomer content of the latex polymer constitutes at least 15 percent by weight of the total monomer content of both the core and the shell.

The polymeric surfactant of the present invention may be used to polymerize additional monomers or mixtures of monomers having ethylenic unsaturation, particularly acrylic or vinyl group containing monomers, so as to form a core-shell latex comprising polymeric particles suspended in water, with each particle containing two polymers. These latices are useful, for example, as binder resins in water based coating compositions.

Optimized theological properties and coating performance are obtained in preferred embodiments by including in the polymerization of the core a combination of crosslinking agents. It has been found particularly advantageous to include a combination of an unsaturated epoxy compound (e.g. glycidyl methacrylate) and a multi-functional vinyl compound (e.g., triallyl cyanurate).

DETAILED DESCRIPTION

The expressions "core" and "shell" are used herein based on the theory that in forming the latex particles of the present invention, the first stage of polymerization results in the formation of a polymeric surfactant which becomes located in an outer or shell region of the final particle, and the second stage polymerization results in the formation of a core on the inside of the shell. Although there is evidence that this "core-shell" morphology does in fact exist, its existence is not essential to the functioning of the present invention. For the purposes of this description, the polymer portion termed the "shell" is intended to indicate that which is polymerized first.

The monomer components used in the first stage polymerization to produce the polymeric surfactant that will form the shell of the latex particles are ethylenically unsaturated monomers selected to yield a polymer having an excess of acid functionality to render the polymer particles stable in an aqueous medium when neutralized with a base. Significantly, the reactants producing the shell include at least 40 percent by weight acid group containing monomers. Preferably the acid group containing monomers may constitute at least 50 percent by weight of the monomer mixture, and in some cases even greater than 60 percent. Attaining the desired combination of coating application and performance at these high acid levels was attained by the use of at least two different acid group containing monomers. Among the preferred acid group containing monomers employed in the first stage are acrylic acid and methacrylic acid in weight ratios of 1:10 to 10:1, preferably 1:3 to 3:1, most preferably 2:3 to 3:2. Optionally the monomer mixture for the first stage may also include minor amounts of one or more additional acid containing monomer copolymerizable with the other monomers. The additional acid containing monomer may be selected from a wide variety of such monomers known to those of skill in the art.

In addition to the acid group containing monomers, the monomer mixture employed in the first stage polymerization typically includes alkyl acrylates (preferably methyl, ethyl, propyl, or butyl acrylate) or the corresponding methacrylates, including mixtures thereof. It is also possible to use as comonomers in minor amounts in the first stage polymerization higher molecular weight acrylic monomers such as 2-ethylhexyl acrylate, cyclohexyl acrylate, n-hexyl acrylate, lauryl acrylate, tridecyl acrylate, isobornyl acrylate, stearyl acrylate, n-decyl methacrylate, benzyl acrylate, isobutyl acrylate, dicyclopentyl acrylate, isodecyl acrylate, tertiary butyl acrylate, palmitic acrylate, ethoxy ethyl acrylate, methoxy butyl acrylate, 2-(2-ethoxy ethoxy) ethyl acrylate, 2-phenoxyethyl acrylate, tetrahydrofurfuryl acrylate, methoxylated tripropylene glycol monoacrylate, 1H-,1H-,5H-octafluoropentyl acrylate, trimethylsiloxyethyl acrylate, or the corresponding methacrylates of the foregoing. The optional acrylate monomers may be present in the first stage monomer mixture in amounts of 0 to 40 percent by weight of the monomer mixture, preferably 5 to 25 percent.

Optionally included in the first stage monomer mixture are one or more non-acrylate monomers having alpha-beta ethylenic unsaturation. These additional non-acrylate monomers may serve as diluents to reduce the cost of the latex, or as modifiers to refine the properties of the polymers. Examples include styrene, methylstyrene, vinyl esters, 1,4-butadiene, acrylonitrile, vinyl ethers, acrylamides, fumarate esters, and the like. These optional non-acrylate monomers may be present in the first stage monomer mixture in amounts of 0 to 40 percent by weight of the monomer mixture, preferably 10 to 30 percent. Preferred embodiments include both acrylate and non-acrylate monomers in the first stage.

The salt of the first stage polymer is formed by partially neutralizing the acid groups of the polymeric surfactant with an appropriate basic compound. Compounds which may be used include organic bases and inorganic bases, although inorganic bases are preferred for the sake of minimizing V.O.C. Examples of bases which may be used for neutralization include alkali metal hydroxides, ammonia, ammonium hydroxide, methylethanolamine, and diethanolamine. The minimum extent to which the acid groups must be neutralized in order to provide stability to the latex can be readily determined by those of skill in the art for a particular composition. Stability is not likely to be attained with less than 20 percent neutralization. Complete neutralization is sometimes preferred for the greatest degree of stability, but in the present invention it was found that blister resistance could be improved by limiting neutralization to less than 100 percent. Thus, in applications where blistering is of concern, such as when coating surfaces having complex shapes, neutralization is preferably no more than 80 percent, most preferably about 75 percent.

The major monomer component used in the second stage polymerization to form the core of the latex particles may be selected from a wide variety of ethylenically unsaturated monomers, including the optional acrylate and non-acrylate unsaturated monomers discussed above in connection with the first stage, preferably a combination of both. Small acrylates, i.e., those having less than three carbon atoms in the side chain, are preferred. Acrylates having four or more carbon atoms in the side chain, such as butyl acrylate, may be included in minor amounts, preferably less than 10 percent by weight of the monomer mixture used in the second stage. Non-acrylate unsaturated monomers may be included as diluents and modifiers as described above in connection with the first stage. The monomer mixture in the second stage may include 30 to 90 percent by weight, preferably 35 to 60 percent, acrylate monomers, and 0 to 90 percent by weight, preferably 35 to 60 percent, non-acryalte unsaturated monomers.

Monomers for the second stage preferably also include a hydroxy group containing monomer, which is useful for providing crosslinking functionality in the polymeric product. Preferably, the hydroxy group containing monomer is a hydroxy functional acrylate such as hydroxyethyl acrylate, hydroxypropyl acrylate, 2-hydroxybutyl acrylate, 4-hydroxybutyl acrylate, acrylate esters of polyethylene glycols, acrylate esters of polypropylene glycols, glycerol monoacrylate, and the like, and the corresponding methacrylates of the foregoing. The hydroxy group containing monomer may be included in the second stage monomer mixture in amounts ranging from 0 to 10 percent by weight.

No acid group containing monomer need be included in the second stage since the core is relatively hydrophobic, but a small amount of acid functionality may be present. A small amount of acid in the core is sometimes considered advantageous in carrying out the polymerization process. The acid group containing monomer may be selected from any of those used in the shell. Acid group containing monomers may be present in the second stage monomer mixture in amounts of 0 to 10 percent by weight.

Optionally, the core, the shell, or both may be crosslinked. Particularly advantageous is the inclusion in the core of a combination of an unsaturated epoxy compound and a multi-functional vinyl compound. Examples of multi-functional vinyl crosslinking monomers include allyl methacrylate, ethylene glycol dimethacrylate, trimethylolpropane triacrylate, triallyl cyanurate and the like to the monomer feeds. The multi-functional vinyl crosslinking monomers may be included in the second stage monomer mixture in amounts of 0 to 5 percent by weight, preferably 0.1 to 1 percent. Examples of unsaturated epoxy crosslinking monomers include glycidyl acrylate, glycidyl methacrylate, and allyl glycidyl ether. The unsaturated epoxy crosslinking monomers may be included in the second stage monomer mixture in amounts of 0 to 5 percent by weight, preferably 0.5 to 2 percent. Coreaction of acid groups with the epoxy groups results in a crosslinked particle. Another crosslinking monomer type that may optionally be included are alkoxy acrylamides such as N-butoxy methyl acrylamide, which may be included in the second stage monomer mixture in amounts of 0 to 10 percent by weight.

Other optional features may advantageously be present in preferred embodiments of the present invention. The polymerization of the polymeric surfactant preferably includes a chain transfer agent in order to limit the molecular weight of the polymer. Restricting the molecular weight of the polymeric surfactant serves to limit the latex particle size, which permits viscosity control in the final product. Various chain transfer agents may be used as are known in the art. The chain transfer agent is preferably a primary or secondary alcohol, most preferably a secondary alcohol such as methylbenzyl alcohol.

A relatively small amount of non-polymeric surfactant may be present during synthesis of the polymers to assist in initially dispersing the monomers, but the the amount of non-polymeric surfactant is insufficient to effect dispersibility or solubility of the latex polymers of the present invention. A small amount of non-polymeric surfactant is also useful in some embodiments for improving coverage of the coating on substrates such as metal.

The relative proportions of the core and shell polymers may vary widely. Typically a latex polymer in accordance with the present invention may include from 20 to 60 percent by weight of the shell polymer and from 40 to 80 percent of the core polymer. Preferably, the core constitutes the major portion.

Although it is one objective of the present invention to minimize V.O.C. of coating compositions, and coating compositions formulated from the latices of the present invention, the present inveniton does not preclude small amounts of organic solvents from being included for purposes known in the art if desired. For example, although the latices of the present invention possess excellent coalescing properties, under some conditions it may be considered useful to add small amounts of organic solvent that aid coalescence. Minor amounts of organic solvent may also be useful in influencing spraying behavior.

Glass transition temperatures as used herein are calculated from the Fox Equation:

$$(1/T_g) = (W_a/T_{ga}) + (W_b/T_{gb}) + \ldots + (W_i/T_{gi})$$

where:

$W_a$=Weight percent of monomer "a."

$T_{ga}$=$T_g$ (glass transition temp.) of a homopolymer of monomer "a."

$W_b$=Weight percent of monomer "b."

$T_{gb}$=$T_g$ (glass transition temp.) of a homopolymer of monomer "b."

$T_g$=Calculated theoretical $T_g$ of the polymer formed from monomers "a, b, . . . i."

Conditions for polymerization are those known in the art for free radical polymerization of alpha, beta ethylenically unsaturated monomers. Polymerization is carried out in water in the presence of a free radical initiator at a temperature suitable for activating the initiator. The free radical initiator may be selected from various initiators commercially available for this purpose and preferably which are soluble in water. Examples include the persulfates such as ammonium, sodium and potassium persulfate. It may also be possible to use other non-aqueous initiators such as organic peroxides such as benzoyl peroxide, t-butyl hydroperoxide, and t-butyl perbenzoate, and azo compounds such as azo-bisisobutyronitrile.

In the following examples, percentages are on the basis of weight unless specifically indicated otherwise.

EXAMPLE 1

This example describes the synthesis of a latex polymer (core-shell type) with 50 percent by weight of acidic group containing monomer (acrylic acid) in the shell portion and 100 percent total neutralization. The following ingredients were used:

| Charge | Weight in grams |
| --- | --- |
| Deionized water | 1977.3 |
| AOT-75[1] | 16.3 |
| Butyl acrylate | 159.3 |
| Methylbenzyl alcohol | 15.2 |
| Acrylic acid | 159.3 |
| Ammonium hydroxide[2] | 134.4 |
| Feed 1 | |
| Ammonium persulfate | 3.0 |
| Deionized water | 200.1 |
| Feed 2 | |
| Ammonium persulfate | 2.8 |
| Deionized water | 287.5 |
| Feed 3 | |
| Methyl methacrylate | 249.6 |
| Styrene | 241.3 |
| Glycidyl methacrylate | 5.6 |
| Triallyl cyanurate | 2.8 |
| Hydroxy ethyl acrylate | 27.8 |
| N-butoxy methyl acrylamide[3] | 50.0 |

[1] "AOT-75" is di-octyl sulfosuccinate, a surfactant available from Air Products Co. at 75 percent solids in n-propanol.
[2] Ammonium hydroxide is 28 percent solution in water.
[3] N-butoxy methyl acrylamide 55.6 percent solution with 36.4 percent butanol and 8 percent xylene (by weight).

After introducing the initial Charge to the flask, a $N_2$ blanket was imposed in the flask, and the Charge was heated to 80° C. while stirring. After the temperature reached 80° C., Feed 1 was added over 2.25 hours. Fifteen minutes after Feed 1 was started, Feeds 2 and 3 were added over 2.0 hours while continuing to stir. After the additions were complete, the contents of the flask were held at 80° C. for 2.0 hours. After the feeds were complete, the contents of the flask were held at 80° C. for 2.0 hours. After the hold period, the reaction product was cooled to room temperature.

EXAMPLE 2

A polymer was prepared in the same way as the polymer in Example 1, but acrylic acid was replaced by methacrylic acid as the acid group containing monomer in the shell.

| Charge | Weight in grams |
| --- | --- |
| Deionized water | 1977.3 |
| AOT-75 | 16.3 |
| Butyl acrylate | 159.3 |
| Methylbenzyl alcohol | 15.2 |
| Methacrylic acid | 159.3 |
| Ammonium hydroxide | 112.5 |

EXAMPLE 3

A polymer was prepared in the same way as the polymer in Example 1, but with a combination of acrylic acid and methacrylic acid being used as the acid group containing monomer in the shell.

| Charge | Weight in grams |
| --- | --- |
| Deionized water | 1977.3 |
| AOT-75 | 16.3 |
| Styrene | 0.0 |
| Butyl acrylate | 159.3 |
| Methyl benzyl alcohol | 15.2 |
| Acrylic acid | 79.7 |
| Methacrylic acid | 79.7 |
| Ammonium hydroxide | 123.4 |

EXAMPLE 4

A polymer was prepared in the same way as the polymer in Example 1, but with 40 percent acid group monomer content in the shell using the following ingredients:

| Charge | |
| --- | --- |
| Deionized water | 1976.0 |
| AOT-75 | 16.3 |
| Styrene | 191.2 |
| Butyl acrylate | 0.0 |
| Methyl benzyl alcohol | 15.2 |
| Acrylic acid | 127.4 |
| Methacrylic acid | 0.0 |
| Ammonium hydroxide | 53.7 |
| Feed 1 | |
| Ammonium persulfate | 3.0 |
| Deionized water | 200.1 |
| Feed 2 | |
| Ammonium persulfate | 2.8 |
| Deionized water | 287.5 |
| Feed 3 | |
| Methyl methacrylate | 249.6 |
| Butyl acrylate | 241.3 |
| Glycidyl methacrylate | 5.6 |
| Triallyl cyanurate | 2.8 |
| Hydroxy ethyl acrylate | 27.8 |
| N-butoxy methyl acrylamide | 50.0 |

Neutralization of the acidic group was 50 percent.

EXAMPLE 5

A polymer was prepared by bulk polymerization using the following charge ingredients to yield 40 percent acid group monomer content in the shell.

| Charge | Weight in grams |
| --- | --- |
| Deionized water | 1977.3 |
| AOT-75 | 16.3 |
| Styrene | 191.2 |
| Methylbenzyl alcohol | 15.2 |
| Acrylic acid | 63.7 |
| Methacrylic acid | 63.7 |
| Ammonium hydroxide | 74.0 |

Feed 1 and Feed 2 were the same as in Example 1; Feed 3 was the same as in Example 4. The charge was weighed into a suitable reactor and heated to 80° C. At this temperature Feed 1 was added over 15 minutes, and the reaction mixture was held for 120 minutes. Feed 2 was then added over 135 minutes. Fifteen minutes after the start of Feed 2, Feed 3 was added over 120 minutes. After the completion of Feeds 2 and 3, the reaction mixture was held for 120 minutes. The product was cooled to room temperature. Neutralization of acidic group was 75 percent.

EXAMPLE 6

Synthesis of latex polymer with 65 percent acid monomer in the shell portion and 100 percent neutralization was carried out in this example following the same procedure as in Example 5.

| Charge | Weight in grams |
| --- | --- |
| Deionized water | 1976.0 |
| AOT-75 | 16.3 |
| Styrene | 60.7 |
| Butyl acrylate | 45.5 |
| Methyl benzyl alcohol | 15.2 |
| Acrylic acid | 98.7 |
| Methacrylic acid | 98.7 |
| Ammonium hydroxide | 152.8 |
| Feed 1 | |
| Ammonium persulfate | 3.0 |
| Deionized water | 200.1 |
| Feed 2 | |
| Ammonium persulfate | 2.8 |
| Deionized water | 287.5 |
| Feed 3 | |
| Methyl methacrylate | 249.6 |
| Styrene | 241.3 |
| Glycidyl methacrylate | 5.6 |
| Triallyl cyanurate | 2.8 |
| Hydroxy ethyl acrylate | 27.8 |
| N-butoxy methyl acrylamide | 50.0 |

EXAMPLE 7

Synthesis of a latex polymer with 50 percent acid monomer in the shell portion and 100 percent neutralization was carried out by replacing Charge ingredients in Example 1 with the following ingredients:

| Charge | Weight in grams |
| --- | --- |
| Deionized water | 1960.2 |
| AOT-75 | 16.3 |
| Styrene | 91.2 |
| Butyl acrylate | 68.3 |
| Methyl benzyl alcohol | 15.2 |

-continued

| Charge | Weight in grams |
|---|---|
| Acrylic acid | 79.7 |
| Methacrylic acid | 79.7 |
| Ammonium hydroxide | 122.6 |

The other Feeds and procedure were same.

EXAMPLE 8

Synthesis of latex polymer with 40 percent acid monomer in the shell portion at 100 percent neutralization was carried out by replacing the Charge ingredients in Example 1 with the following ingredients:

| Charge | Weight in grams |
|---|---|
| Deionized water | 1977.3 |
| AOT-75 | 16.3 |
| Styrene | 109.2 |
| Butyl acrylate | 81.8 |
| Methyl benzyl alcohol | 15.2 |
| Acrylic acid | 63.8 |
| Methacrylic acid | 63.8 |
| Ammonium hydroxide | 98.9 |

The other Feeds and procedure were the same.

EXAMPLE 9

Synthesis of latex polymer with 30 percent acid monomer in the shell portion at 100 percent neutralization was carried out by replacing the Charge ingredients in Example 6 with the following ingredients:

| Charge | Weight in grams |
|---|---|
| Deionized water | 1977.3 |
| AOT-75 | 16.3 |
| Styrene | 129.3 |
| Butyl acrylate | 93.7 |
| Methyl benzyl alcohol | 15.2 |
| Acrylic acid | 47.8 |
| Methacrylic acid | 47.8 |
| Ammonium hydroxide | 74.1 |

The other Feeds and procedure were same.

EXAMPLE 10

Synthesis of latex polymer with 20 percent acid monomer in the shell portion at 100 percent neutralization was carried out by replacing the ingredients of the Charge in Example 1 with the following ingredients:

| Charge | Weight in grams |
|---|---|
| Deionized water | 1977.3 |
| AOT-75 | 16.3 |
| Styrene | 147.8 |
| Butyl acrylate | 107.0 |
| Methylbenzyl alcohol | 15.2 |
| Acrylic acid | 31.8 |
| Methacrylic acid | 31.8 |
| Ammonium hydroxide | 49.4 |

The other Feeds and procedure were same

EXAMPLE 11

The latex polymer of this example was prepared in the same manner as Example 6, but with half the amount of surfactant "AOT-75." The resulting product had theoretical solids content of 25 percent and viscosity of 160 centipoise. Neutralization was 100 percent.

EXAMPLE 12

The latex polymer of this Example was prepared in the same way as the polymer in Example 11, but without "AOT-75" surfactant.

EXAMPLE 13

Synthesis of latex polymer at 75 percent neutralization was carried out in the same way as the polymer in Example 6, but the amount of ammonium hydroxide used was 115.3 grams. The acid monomer content of the shell portion was 65 percent.

EXAMPLE 14

Synthesis of latex polymer with 65 percent acidic monomer in the shell portion and with 50 percent total neutralization was carried out as follows:

| Charge | Weight in grams |
|---|---|
| Deionized water | 1976.0 |
| AOT-75 | 16.3 |
| Styrene | 60.7 |
| Butyl acrylate | 45.5 |
| Methyl benzyl alcohol | 15.2 |
| Acrylic acid | 98.7 |
| Methacrylic acid | 98.7 |
| Ammonium hydroxide | 76.4 |
| Feed 1 | |
| Ammonium persulfate | 3.0 |
| Deionized water | 200.1 |
| Feed 2 | |
| Ammonium persulfate | 2.8 |
| Deionized water | 287.5 |
| Feed 3 | |
| Methyl methacrylate | 249.6 |
| Styrene | 241.3 |
| Glycidyl methacrylate | 5.6 |
| Triallyl cyanurate | 2.8 |
| Hydroxy ethyl acrylate | 27.8 |
| N-butoxy methyl acrylamide | 50.0 |

EXAMPLE 15

A latex polymer was prepared in the same way as the polymer in Example 14, but with the addition of 3 percent butyl acrylate in Feed 3. Neutralization was at 75 percent.

EXAMPLE 16

A latex polymer was prepared in the same way as the polymer in Example 15, but with the addition of 5 percent butyl acrylate in Feed 3.

EXAMPLE 17

A latex polymer was prepared in the same way as the polymer in Example 15, but with the addition of 7 percent butyl acrylate in Feed 3.

EXAMPLE 18

A polymer was prepared in the same way as the polymer in Example 13, but ammonium hydroxide was replaced by dimethylethanolamine on an equimolar basis as the neutralizing agent.

PERFORMANCE TESTING

The latex polymers of Examples 1 through 18 were formulated into coating compositions and tested for performance as reported in Table I. Each was neutralized to a pH of approximately 8.5 to 9.0, and a crosslinking agent added to permit curing of the coatings. Known crosslinking agents such as aminoplasts may be employed. Particularly suitable are alkyl ester substituted melamine resins that are commercially available as crosslinking agents. In these examples the crosslinking agent was CYMEL® 303 available from American Cyanamide. Surfactant was added to promote flow and wetability of the substrate, and a defoaming surfactant was included. A small amount of organic solvent was added to improve spray atomization.

Each of the compositions was spray applied onto an aluminum panel at a dry film thickness of 0.1 to 0.2 mil and cured at 325° F. for one minute and at 400° F. for another minute. After curing, each panel was inspected for the presence of blistering. Blistering is evidenced by the formation of bubbles in the coating during curing. Each coated panel was tested for detergent resistance by immersing the panel for fifteen minutes in a boiling detergent solution. The detergent solution included 21 milliliters of "Orvus K" anionic detergent from Proctor & Gamble (to which phosphoric acid had been added in the ratio of 10 milliters per liter of detergent), 1.0 gram magnesium sulfate, 1.0 gram calcium chloride, and 0.5 gram calcium carbonate. Upon removal from the boiling detergent solution, each panel was rinsed in hot water, dried, inspected for blush and corrosion, and then subjected to a coating adhesion test. For the adhesion test, each coating was crosshatched with a scribing tool comprising four scalpels joined together with blades approximately ⅛ inch (3 millimeters). "Scotch" No. 610 tape from 3M was applied over the area of cuts by pressing down firmly against the coating to eliminate voids and air pockets. Then the tape was quickly pulled off with one motion, and the test sample was examined for removal or blistering of the coating. Acid resistance was determined by immersing each panel into a 5% phosphoric acid solution for ten days, after which the panel was inspected for blush, corrosion, and adhesion.

Blister resistance, detergent resistance, and acid resistance performance as reported in Table I were rated in accordance with the following scale:

| Rating | Description |
| --- | --- |
| 1 | Excellent |
| 2 | Good |
| 3 | Borderline |
| 4 | Unacceptable |
| 5 | Very poor |

The viscosities reported in Table I are measured with a Brookfield Viscometer with a number 3 spindle at 50 rpm. The VOC reported in Table I is that of the coating formulation. The $T_g$ values in Table I are calculated theoretical values.

TABLE I

| EXAMPLE | RESIN VISCOSITY (cps) | FORMULA VISCOSITY (cps) | VOC (lb/gal) | BLISTER RESISTANCE | DETERGENT RESISTANCE | ACID RESISTANCE | $T_g$ (°C.) |
| --- | --- | --- | --- | --- | --- | --- | --- |
| 1 | 24 | 40 | 0.72 | 5 | 5 | 5 | 95 |
| 2 | 1720 | 670 | 0.78 | 1 | 5 | 5 | 95 |
| 3 | 214 | 205 | 0.72 | 2 | 5 | 5 | 95 |
| 4 | 72 | 70 | 0.84 | 2 | 2 | 4 | 9 |
| 5 | 78 | 56 | 0.83 | 3 | 2 | 4 | 9 |
| 6 | 195 | 140 | 0.95 | 2 | 2 | 4 | 95 |
| 7 | 80 | 50 | 1.00 | 3 | 2 | 3 | 95 |
| 8 | 48 | 30 | 0.96 | 4 | 2 | 2 | 95 |
| 9 | 92 | 30 | 0.83 | 4 | 2 | 1 | 95 |
| 10 | 28 | 16 | 0.79 | 5 | 2 | 1 | 95 |
| 11 | 164 | 84 | 1.03 | 2 | 2 | 5 | 95 |
| 12 | 182 | 76 | 1.04 | 2 | 2 | 5 | 95 |
| 13 | 177 | 126 | 1.18 | 1 | 1 | 2 | 95 |
| 14 | 311 | 350 | 1.36 | 1 | 2 | 2 | 95 |
| 15 | 560 | 260 | 1.14 | 3 | 2 | 2 | 88 |
| 16 | 1100 | 260 | 1.08 | 2 | 3 | 3 | 83 |
| 17 | 1800 | 560 | 0.90 | 1 | 4 | 4 | 78 |
| 18 | 235 | 138 | 1.86 | 1 | 1 | 1 | 95 |

Each of the compositions was spray applied onto an aluminum panel at a dry film thickness of 0.1 to 0.2 mil and cured at 325° F. for one minute and at 400° F. for another minute. After curing, each panel was inspected for the presence of blistering. Blistering is evidenced by the formation of bubbles in the coating during curing. Each coated panel was tested for detergent resistance by immersing the panel for fifteen minutes in a boiling detergent solution. The detergent solution included 21 milliliters of "Orvus K" anionic detergent from Proctor & Gamble (to which phosphoric acid had been added in the ratio of 10 milliters per liter of detergent), 1.0 gram magnesium sulfate, 1.0 gram calcium chloride, and 0.5 gram calcium carbonate. Upon removal from the boiling detergent solution, each panel was rinsed in hot water, dried, inspected for blush and corrosion, and then subjected to a coating adhesion test. For the adhesion test, each coating was crosshatched with a scribing tool comprising four scalpels joined together with blades approximately ⅛ inch (3 millimeters). "Scotch" No. 610 tape from 3M was applied over the area of cuts by pressing down firmly against the coating to eliminate voids and air pockets. Then the tape was quickly pulled off with one motion, and the test sample was examined for removal or blistering of the coating. Acid resistance was determined by immersing each panel into a 5% phosphoric acid solution for ten days, after which the panel was inspected for blush, corrosion, and adhesion.

Blister resistance, detergent resistance, and acid resistance performance as reported in Table I were rated in accordance with the following scale:

| Rating | Description |
| --- | --- |
| 1 | Excellent |
| 2 | Good |
| 3 | Borderline |
| 4 | Unacceptable |
| 5 | Very poor |

The viscosities reported in Table I are measured with a Brookfield Viscometer with a number 3 spindle at 50 rpm. The VOC reported in Table I is that of the coating formulation. The $T_g$ values in Table I are calculated theoretical values.

TABLE I

| EXAMPLE | RESIN VISCOSITY (cps) | FORMULA VISCOSITY (cps) | VOC (lb/gal) | BLISTER RESISTANCE | DETERGENT RESISTANCE | ACID RESISTANCE | $T_g$ (°C) |
|---|---|---|---|---|---|---|---|
| 1 | 24 | 40 | 0.72 | 5 | 5 | 5 | 95 |
| 2 | 1720 | 670 | 0.78 | 1 | 5 | 5 | 95 |
| 3 | 214 | 205 | 0.72 | 2 | 5 | 5 | 95 |
| 4 | 72 | 70 | 0.84 | 2 | 2 | 4 | 9 |
| 5 | 78 | 56 | 0.83 | 3 | 2 | 4 | 9 |
| 6 | 195 | 140 | 0.95 | 2 | 2 | 4 | 95 |
| 7 | 80 | 50 | 1.00 | 3 | 2 | 3 | 95 |
| 8 | 48 | 30 | 0.96 | 4 | 2 | 2 | 95 |
| 9 | 92 | 30 | 0.83 | 4 | 2 | 1 | 95 |
| 10 | 28 | 16 | 0.79 | 5 | 2 | 1 | 95 |
| 11 | 164 | 84 | 1.03 | 2 | 2 | 5 | 95 |
| 12 | 182 | 76 | 1.04 | 2 | 2 | 5 | 95 |
| 13 | 177 | 126 | 1.18 | 1 | 1 | 2 | 95 |
| 14 | 311 | 350 | 1.36 | 1 | 2 | 2 | 95 |
| 15 | 560 | 260 | 1.14 | 3 | 2 | 2 | 88 |
| 16 | 1100 | 260 | 1.08 | 2 | 3 | 3 | 83 |
| 17 | 1800 | 560 | 0.90 | 1 | 4 | 4 | 78 |
| 18 | 235 | 138 | 1.86 | 1 | 1 | 1 | 95 |

Examples 1 through 3 illustrate the benefit of using a combination of acrylic acid and methacrylic acid as opposed to either one separately. Example 1, containing acrylic acid as the only acid group containing monomer in the shell resulted in very low latex viscosity, causing low blister resistance. Replacing acrylic acid with methacrylic acid in Example 2 improved blister resistance, but resulted in very high latex viscosity which presents difficulty in processing and spraying.

Examples 4 and 5 have lower total acid monomer levels and lower degrees of neutralization compared to Examples 1 through 3. Viscosities were improved, but performance properties remained marginal. Example 5 used the preferred bulk polymerization method rather than sequential polymerization.

Examples 6 through 10 illustrate the effect of varying the acid content of the shell portion of the latex. As the amount of acid in the shell was decreased, the acid resistance was improved, but blister resistance worsened. Acid resistance is significant for some applications where the coating comes into contact with an acid medium, but for some applications contemplated for the broader aspects of the present invention, attaining good blister resistance is more important than acid resistance.

Examples 11 and 12 have lower amounts of non-polymeric surfactant than the other examples. Worsening of acid resistance resulted. These examples also had poorer coverage when spray-applied onto a metal surface. For these reasons, a small amount of surfactant is included in preferred embodiments of the present invention.

Examples 13 and 14 may be compared to Example 6. The same monomers were used in all three of those examples, but the degree of neutralization was reduced in Examples 13 and 14 to 75 percent and 50 percent respectively. Lower neutralization resulted in substantially better acid resistance while maintaining or improving blister resistance and detergent resistance, thereby making Examples 13 and 14 preferred embodiments. These examples may also be compared to Examples 4 and 5 wherein partial neutralization was employed with acid monomer levels that were marginally low.

Examples 15 through 17 are a series in which the shell was maintained constant and increasing amounts of butyl acrylate were incorporated into the core. Viscosity increased with increasing amounts of butyl acrylate, accompanied by improvement in blister resistance. However, detergent resistance and acid resistance worsened.

Example 18 illustrates the use of an organic amine instead of ammonium hydroxide as the neutralizing medium. Good viscosities were attained, and all the tested performance characteristics were excellent. However, V.O.C. was somewhat higher.

Other variations and modifications as are known to those of skill in the art may be resorted to without departing from the scope of the invention as defined by the claims that follow.

We claim:

1. An aqueous polymeric composition comprising:
   water; and
   a polymeric surfactant which is the reaction product of ethylenically unsaturated monomers, at least 40 percent by weight of which are acid group containing monomers, the acid group containing monomers including two different unsaturated acid group containing acrylic monomers in relative proportions of 1:10 to 10:1, wherein the two different acid group containing monomers include acrylic acid and methacrylic acid, and wherein the acid groups have been at least partially neutralized by a base so as to render the polymeric surfactant dispersible in water.

2. The composition of claim 1 wherein the monomers comprise greater than 50 percent by weight acid group containing monomers.

3. The composition of claim 1 wherein the monomers comprise greater than 60 percent by weight acid group containing monomers.

4. The composition of claim 1 wherein the acid group containing monomers comprise acrylic acid and methacrylic acid in relative proportions of 1:3 to 3:1.

5. The composition of claim 1 wherein the acid group containing monomers comprise acrylic acid and methacrylic acid in relative proportions of 2:3 to 3:2.

6. The composition of claim 1 wherein 20 to 80 percent of the acid groups are neutralized.

7. The composition of claim 1 wherein 50 to 80 percent of the acid groups are neutralized.

8. The composition of claim 1 wherein the polymeric surfactant is a reaction product of, in addition to the acrylic acid group containing monomers, 5 to 25 percent by weight of aklyl acrylate monomer and 10 to 30 percent of non-acrylate vinyl monomer.

9. The composition of claim 8 wherein the non-acrylate vinyl monomer comprises styrene.

10. The composition of claim 1 wherein the reactants from which the surfactant is polymerized further include a chain transfer agent comprising a primary or secondary alcohol.

11. The composition of claim 10 wherein the chain transfer agent comprises a secondary alcohol.

12. The composition of claim 11 wherein the secondary alcohol comprises methylbenzyl alcohol.

13. An aqueous acrylic latex comprising polymeric particles, at least a portion of said particles containing two polymers, the first polymer being polymerized from ethylenically unsaturated monomers at least 40 percent by weight of which are acid group containing monomers, including two different unsaturated acid group containing acrylic monomers in relative proportions of 1:10 to 10:1, wherein the acid group containing monomers from which the first polymer is polymerized comprise acrylic acid and methacrylic acid, and the second polymer being polymerized from ethylenically unsaturated monomers.

14. The composition of claim 13 wherein the monomers from which the first polymer is polymerized comprise greater than 50 percent by weight acid group containing monomers.

15. The composition of claim 13 wherein the monomers from which the first polymer is polymerized comprise greater than 60 percent by weight acid group containing monomers.

16. The composition of claim 13 wherein the acid group containing monomers from which the first polymer is polymerized comprise acrylic acid and methacrylic acid in relative proportions of 1:3 to 3:1.

17. The composition of claim 13 wherein the acid group containing monomers from which the first polymer is polymerized comprise acrylic acid and methacrylic acid in relative proportions of 2:3 to 3:2.

18. The composition of claim 13 wherein greater than 15 percent by weight of the total monomers from which said latex particles are polymerized are acid group containing monomers.

19. The composition of claim 13 wherein 20 to 80 percent of the acid groups are neutralized.

20. The composition of claim 13 wherein 50 to 80 percent of the acid groups are neutralized.

21. The composition of claim 13 wherein the first polymer is a reaction product of, in addition to the acrylic acid group containing monomers, 5 to 25 percent by weight of alkyl acrylate monomer and 10 to 30 percent of non-acrylate vinyl monomer.

22. The composition of claim 21 wherein the non-acrylate vinyl monomer comprises styrene.

23. The composition of claim 13 wherein the second polymer is the reaction product of 35 to 60 percent acrylate monomer and 35–60 percent non-acrylate vinyl monomer.

24. The composition of claim 23 wherein the non-acrylate vinyl monomer from which the second polymer is polymerized is vinyl aryl monomer.

25. The composition of claim 24 wherein the alkyl acrylate monomer from which the second polymer is polymerized is methyl methacrylate.

26. The composition of claim 23 wherein styrene and methyl methacrylate comprise at least 70 percent by weight of the monomers from which the second polymer is polymerized.

27. The composition of claim 13 wherein the reactants further include a chain transfer agent present in the polymerization of the first polymer, the chain transfer agent comprising a primary or secondary alcohol.

28. The composition of claim 27 wherein the chain transfer agent comprises a secondary alcohol.

29. The composition of claim 28 wherein the secondary alcohol comprises methylbenzyl alcohol.

30. The composition of claim 13 wherein the latex includes a combination of crosslinking agents including an unsaturated epoxy compound and a multi-functional vinyl compound.

31. The composition of claim 30 wherein the unsaturated epoxy compound comprises glycidyl methacrylate.

32. The composition of claim 30 wherein the multi-functional vinyl compound comprises triallyl cyanurate.

33. The composition of claim 13 wherein the latex includes an alkoxy acrylamide compound.

34. The composition of claim 33 wherein the alkoxy acrylamide compound comprises N-butoxymethylacrylamide.

35. The composition of claim 13 wherein the monomers from which the second polymer is polymerized additionally include hydroxy acrylate.

36. The composition of claim 13 wherein the $T_g$ of the latex polymer is greater than 25° C.

37. The composition of claim 13 wherein the $T_g$ of the latex polymer is greater than 40° C.

38. The composition of claim 13 wherein the $T_g$ of the latex polymer is greater than 60° C.

* * * * *